United States Patent
Song et al.

(10) Patent No.: US 9,462,274 B2
(45) Date of Patent: Oct. 4, 2016

(54) TRANSFORMATION MODE ENCODING AND DECODING METHOD AND APPARATUS

(71) Applicant: Huawei Technologies Co., Ltd., Shenzhen, Guangdong (CN)

(72) Inventors: Jin Song, Moscow (RU); Jiantong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 371 days.

(21) Appl. No.: 14/266,149

(22) Filed: Apr. 30, 2014

(65) Prior Publication Data

US 2014/0233643 A1 Aug. 21, 2014

Related U.S. Application Data

(63) Continuation of application No. PCT/CN2012/084082, filed on Nov. 5, 2012.

(30) Foreign Application Priority Data

Nov. 4, 2011 (CN) .......................... 2011 1 0346062

(51) Int. Cl.
*H04N 7/32* (2006.01)
*H04N 19/61* (2014.01)
*H04N 19/159* (2014.01)
*H04N 19/176* (2014.01)
*H04N 19/147* (2014.01)
(Continued)

(52) U.S. Cl.
CPC ...... *H04N 19/00781* (2013.01); *H04N 19/122* (2014.11); *H04N 19/147* (2014.11); *H04N 19/159* (2014.11); *H04N 19/176* (2014.11); *H04N 19/46* (2014.11); *H04N 19/61* (2014.11)

(58) Field of Classification Search
None
See application file for complete search history.

(56) References Cited

U.S. PATENT DOCUMENTS

2007/0171978 A1 7/2007 Chono
2008/0260027 A1 10/2008 Karczewicz
(Continued)

FOREIGN PATENT DOCUMENTS

CN 101415121 A 4/2009
CN 101658043 A 2/2010
(Continued)

OTHER PUBLICATIONS

Zhang et al., "Enhanced Intra Prediction and Transform for Video Coding," Proceedings of 2010 IEEE 17th International Conference on Image Processing, pp. 3381-3384, Institute of Electrical and Electronics Engineers, New York, New York (Sep. 26-29, 2010).

(Continued)

*Primary Examiner* — Sath V Perungavoor
*Assistant Examiner* — Janese Duley
(74) *Attorney, Agent, or Firm* — Leydig, Voit & Mayer, Ltd.

(57) ABSTRACT

Embodiments of the present invention disclose a transformation mode encoding and decoding method and apparatus. A correlation between the prediction mode and the transformation mode is used, and an optimal transformation mode candidate set is simplified, thereby saving resources when an index of an optimal transformation mode is encoded in encoding header information. In addition, encoding efficiency is higher when an encoding end elects a transformation mode.

19 Claims, 11 Drawing Sheets

(51) Int. Cl.
*H04N 19/46* (2014.01)
*H04N 19/122* (2014.01)

(56) References Cited

U.S. PATENT DOCUMENTS

| | | | |
|---|---|---|---|
| 2010/0195715 A1* | 8/2010 | Liu et al. | H04N 7/50 375/240.02 |
| 2012/0033731 A1 | 2/2012 | Yamamoto et al. | |
| 2012/0195379 A1 | 8/2012 | Alshin et al. | |
| 2012/0201303 A1 | 8/2012 | Yang et al. | |
| 2013/0028326 A1 | 1/2013 | Moriya et al. | |
| 2014/0348235 A1* | 11/2014 | Yamamoto et al. | H04N 19/00569 375/240.12 |

FOREIGN PATENT DOCUMENTS

| | | |
|---|---|---|
| CN | 102045560 A | 5/2011 |
| WO | 2010116869 A1 | 10/2010 |
| WO | 2011016702 A2 | 2/2011 |
| WO | 2011031332 A1 | 3/2011 |
| WO | 2011125313 A1 | 10/2011 |

OTHER PUBLICATIONS

Yuan et al., "CE2: Non-Square Quadtree Transform for symmetric motion partition," Joint Collaborative Team on Video Coding (JCT-VC) of ITU-T SG16 WP3 and ISO/IEC JTC1/SC29/WG11, 6$^{th}$ Meeting: Torino, Italy (Jul. 14-22, 2001).

* cited by examiner

TRANSFORMATION MODE ENCODING AND DECODING METHOD AND APPARATUS

CROSS-REFERENCE TO RELATED APPLICATIONS

This application is a continuation of International Patent Application No. PCT/CN2012/084082, filed on Nov. 5, 2012, which claims priority to Chinese Patent Application No. 201110346062.4, filed on Nov. 4, 2011, both of which are hereby incorporated by reference in their entireties.

TECHNICAL FIELD

The present invention relates to the field of communications technologies, and in particular, to a transformation mode encoding and decoding method and apparatus.

BACKGROUND

Transform encoding is a component of a video encoding and decoding technology. The transform encoding refers to performing a certain functional transformation on a signal to transform the signal in one signal space to a signal in another signal space, and then quantizing and encoding the transformed signal. Data compression in a transform encoding system has three steps: transforming, quantizing, and entropy encoding. Generally, a transformation process is reversible, that is, an inverse transformation exists, so as to restore original data. An encoding end obtains residual data of a video image by using predictive encoding, quantizes the residual data, and encodes the quantized residual data in a code stream by entropy encoding, thereby completing an encoding process. A decoding end parses the code stream to obtain data, reconstructs the residual data by inverse quantizing and inverse transformation, and reconstructs a decoded image with reference to a predicted value obtained from the predictive encoding, thereby completing a decoding process.

In a current transform encoding technology, different transformation types exist according to different transformation matrices, where one classification manner is classification, according to a shape of a transformation matrix, into three transformation modes including a square block transformation, a latitudinal rectangular block transformation, and a longitudinal rectangular block transformation, so as to process three residual data block types including a square block, a latitudinal rectangular block, and a longitudinal rectangular block respectively, as shown in FIG. 1.

Currently, at a video encoding end, when a transformation mode is selected, an optimal transformation mode is selected from the foregoing three transformation modes according to a rate distortion optimization rule; and residual data is transformed by using the selected transformation mode, and selection information of the transformation mode is encoded in a code stream and transferred to a decoding end.

At the video encoding end, a mode needs to be selected among three scanning modes, and therefore, complexity at the encoding end is high. In addition, the selection information of the transformation mode needs to be encoded into the code stream, thereby affecting compression and encoding efficiency.

SUMMARY

Embodiments of the present invention provide a transformation mode encoding and decoding method and apparatus, so as to reduce complexity at an encoding end and improve compression and encoding efficiency.

An embodiment of the present invention provides a transformation mode encoding method, including:
  obtaining a prediction mode of a predicted data block that corresponds to a residual data block of a to-be-encoded video image;
  selecting a transformation mode corresponding to the prediction mode from a candidate transformation mode set; and
  performing a transformation operation on the residual data block of the to-be-encoded video image by using the transformation mode.

An embodiment of the present invention provides a transformation mode decoding method, including:
  obtaining a prediction mode of a predicted data block that corresponds to a transformation coefficient block of a to-be-decoded image;
  selecting a transformation mode corresponding to the prediction mode from a candidate transformation mode set; and
  performing an inverse transformation operation on the transformation coefficient block of the to-be-decoded image by using the transformation mode.

An embodiment of the present invention provides a transformation mode encoding apparatus, including:
  a first obtaining unit, configured to obtain a prediction mode of a predicted data block that corresponds to a residual data block of the to-be-encoded video image;
  a first selecting unit, configured to select a transformation mode corresponding to the prediction mode from a candidate transformation mode set; and
  a first processing unit, configured to perform a transformation operation on the residual data block of the to-be-encoded video image by using the transformation mode.

An embodiment of the present invention provides a transformation mode decoding apparatus, including:
  a fourth obtaining unit, configured to obtain a prediction mode of a predicted data block that corresponds to a transformation coefficient block of a to-be-decoded image;
  a fourth selecting unit, configured to select a transformation mode corresponding to the prediction mode from a candidate transformation mode set; and
  a fourth processing unit, configured to perform an inverse transformation operation on the transformation coefficient block of the to-be-decoded image by using the transformation mode.

An embodiment of the present invention provides a transformation mode encoding method, including:
  obtaining a prediction mode of a predicted data block that corresponds to a residual data block of the to-be-encoded video image;
  determining a simplified candidate transformation mode set according to the prediction mode and a correspondence between a candidate transformation mode set and the prediction mode;
  preferentially selecting an optimal transformation mode from the simplified candidate transformation mode set, where the optimal transformation mode is used to minimize distortion of the to-be-encoded video image and a reconstructed video image that is obtained by a decoding end and minimize a quantity of encoding bits required for the to-be-encoded video image;

performing a transformation operation on the residual data block of the to-be-encoded video image by using the optimal transformation mode; and encoding an index of the optimal transformation mode in a code stream.

An embodiment of the present invention provides a transformation mode decoding method, including:

obtaining a prediction mode of a predicted data block that corresponds to a transformation coefficient block of a to-be-decoded image;

determining a simplified candidate transformation mode set according to the prediction mode and a correspondence between a candidate transformation mode set and the prediction mode;

parsing a code stream to obtain an index of an optimal transformation mode; and performing an inverse transformation operation on the transformation coefficient block of the to-be-decoded image by using the optimal transformation mode.

An embodiment of the present invention provides a transformation mode encoding apparatus, including:

a second obtaining unit, configured to obtain a prediction mode of a predicted data block that corresponds to a residual data block of the to-be-encoded video image;

a second determining unit, configured to determine a simplified candidate transformation mode set according to the prediction mode and a correspondence between a candidate transformation mode set and the prediction mode;

a second selecting unit, configured to preferentially select an optimal transformation mode from the simplified candidate transformation mode set, where the optimal transformation mode is used to minimize distortion of the to-be-encoded video image and a reconstructed video image that is obtained by a decoding end and minimize a quantity of encoding bits required for the to-be-encoded video image;

a second encoding unit, configured to encode an index of the optimal transformation mode in a code stream; and a second processing unit, configured to perform a transformation operation on the residual data block of the to-be-encoded video image by using the optimal transformation mode.

An embodiment of the present invention provides a transformation mode decoding apparatus, including:

a fifth obtaining unit, configured to obtain a prediction mode of a predicted data block that corresponds to a transformation coefficient block of a to-be-decoded image;

a fifth determining unit, configured to determine a simplified candidate transformation mode set according to the prediction mode and a correspondence between a candidate transformation mode set and the prediction mode;

a fifth decoding unit, configured to parse a code stream to obtain an index of an optimal transformation mode; and a fifth processing unit, configured to perform an inverse transformation operation on the transformation coefficient block of the to-be-decoded image by using the transformation mode.

An embodiment of the present invention provides a transformation mode encoding method, including:

obtaining a prediction mode of a predicted data block that corresponds to a residual data block of the to-be-encoded video image;

preferentially selecting an optimal transformation mode from a candidate transformation mode set, where the optimal transformation mode is used to minimize distortion of the to-be-encoded video image and a reconstructed video image that is obtained by a decoding end and minimize a quantity of encoding bits required for the to-be-encoded video image;

determining whether the optimal transformation mode is a mode having a correspondence with the prediction mode;

writing a determination result in a code stream;

if the determination result is no, encoding an index of the optimal transformation mode in the code stream; and performing a transformation operation on the residual data block of the to-be-encoded video image by using the optimal transformation mode.

An embodiment of the present invention provides a transformation mode decoding method, including:

obtaining a prediction mode of a predicted data block that corresponds to a transformation coefficient block of a to-be-decoded image;

parsing a code stream to obtain a determination result about whether an optimal transformation mode is a mode having a correspondence with the prediction mode;

if the determination result is no, parsing the code stream to obtain an index of the optimal transformation mode; and performing an inverse transformation operation on the transformation coefficient block of the to-be-decoded image by using the optimal transformation mode.

An embodiment of the present invention provides a transformation mode encoding apparatus, including:

a third obtaining unit, configured to obtain a prediction mode of a predicted data block that corresponds to a residual data block of the to-be-encoded video image;

a third selecting unit, configured to preferentially select an optimal transformation mode from a candidate transformation mode set, where the optimal transformation mode is used to minimize distortion of the to-be-encoded video image and a reconstructed video image that is obtained by a decoding end and minimize a quantity of encoding bits required for the to-be-encoded video image;

a third determining unit, configured to determine whether the optimal transformation mode is a mode having a correspondence with the prediction mode;

a third encoding unit, configured to encode the determination result and an index of the optimal transformation mode in a code stream; and a third processing unit, configured to perform a transformation operation on the residual data block of the to-be-encoded video image by using the optimal transformation mode.

An embodiment of the present invention provides a transformation mode decoding apparatus, including:

a sixth obtaining unit, configured to obtain a prediction mode of a predicted data block that corresponds to a transformation coefficient block of a to-be-decoded image;

a sixth determining unit, configured to determine a transformation mode that corresponds to the prediction mode and is in a candidate transformation mode set;

a sixth decoding unit, configured to parse a code stream to obtain a determination result about whether an optimal transformation mode is a mode having a correspondence with the prediction mode, and an index of the optimal transformation mode; and a sixth processing unit, configured to perform an inverse transformation operation on the transformation coefficient block of the to-be-decoded image by using the transformation mode.

By using the foregoing technical solutions, in the embodiments of the present invention, a correlation between the prediction mode and the transformation mode is used, and an optimal transformation mode candidate set is simplified, thereby saving resources when an index of an optimal transformation mode is encoded in encoding header information. In addition, encoding efficiency is higher when an encoding end elects a transformation mode.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description are only some embodiments of the present invention, and a person of ordinary skill in the art may still derive other drawings from the accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the embodiments to be described are only a part rather than all of the embodiments of the present invention. All other embodiments obtained by a person of ordinary skill in the art based on the embodiments of the present invention without creative efforts shall fall within the protection scope of the present invention.

In the embodiments of the present invention, during an encoding process, an encoding end selects, for each to-be-encoded block, an optimal encoding type from various encoding types according to a rate distortion rule; obtains prediction information; obtains a predicted value of the to-be-encoded block according to the prediction information and information of an encoded reconstructed frame; calculates a difference between the predicted value and a pixel value of the to-be-encoded block, so as to obtain a residual value; sequentially performs operations of transformation, quantization, scanning, and entropy encoding on the residual value, and encodes a value obtained after the operations in a code stream; and encodes the prediction information in the code stream, thereby completing the encoding process. The following describes the scanning in the encoding process and a decoding process in detail. The transformation mentioned in the embodiments of the present invention may be a discrete cosine transformation, or may also be a multi-transformation technology, which is not limited in the embodiments of the present invention.

Figure 1A:
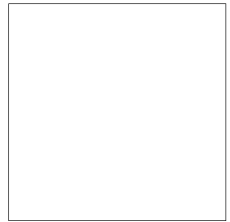
FIG. 1A is a schematic diagram of shapes of a residual data block of the to-be-encoded video image and a transformation coefficient block of a to-be-decoded image that correspond to a square block transformation according to an embodiment of the present invention.
Figure 1B:
FIG. 1B is a schematic diagram of shapes of a residual data block of the to-be-encoded video image and a transformation coefficient block of a to-be-decoded image that correspond to a latitudinal rectangular block transformation according to an embodiment of the present invention.
Figure 1C:
FIG. 1C is a schematic diagram of shapes of a residual data block of the to-be-encoded video image and a transformation coefficient block of a to-be-decoded image that correspond to a longitudinal rectangular block transformation according to an embodiment of the present invention.
Figure 2:
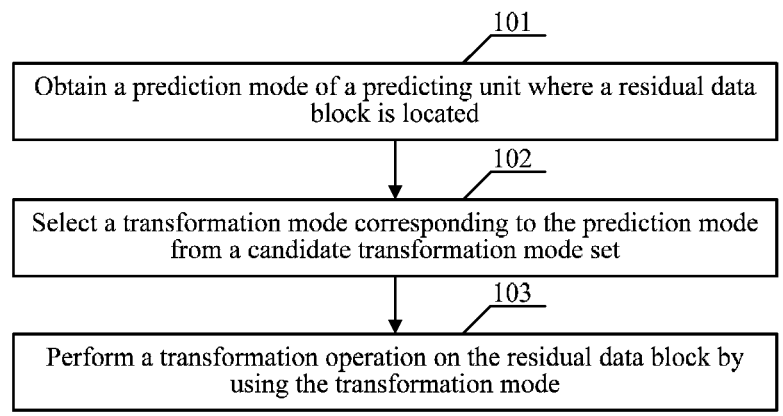
FIG. 2 is a schematic flowchart of a method according to an embodiment of the present invention.

Exemplary solution 1: The following describes a transformation mode selection procedure executed at an encoding end in detail. As shown in FIG. 2, the transformation mode selection procedure includes:

101: Obtain a prediction mode of a predicted data block that corresponds to a residual data block of the to-be-encoded video image, and more specifically, obtain an intra-frame prediction mode of the predicted data block that corresponds to the residual data block of the to-be-encoded video image.

102: Select a transformation mode corresponding to the prediction mode from a candidate transformation mode set, and more specifically, determine a correspondence between the prediction mode and the transformation mode according to a principle that "if the prediction mode is an intra-frame prediction mode, when a quantity of pixels that are among predicted pixels in the prediction mode and are located at an upper boundary and an upper right boundary of an encoding unit exceeds a set quantity, select a latitudinal rectangular block transformation as a transformation type corresponding to the prediction mode; when a quantity of pixels that are among the predicted pixels in the prediction mode and are located at a left boundary and a lower left boundary of the encoding unit exceeds the set quantity, select a longitudinal rectangular block transformation as a transformation type corresponding to the prediction mode; otherwise, select a square block transformation as a transformation type corresponding to the prediction mode". For example, in a horizontal prediction mode, select the longitudinal rectangular block transformation as a transformation type corresponding to the prediction mode, and in a vertical prediction mode, select the latitudinal rectangular block transformation as a transformation type corresponding to the prediction mode. A specific correspondence is not specifically limited in the principle. The quantity of the pixels among the predicted pixels and with a quantity exceeding the set quantity may be all, half, or two thirds, which is not specifically limited herein.

103: Perform a transformation operation on the residual data block of the to-be-encoded video image by using the transformation mode.

Figure 3:
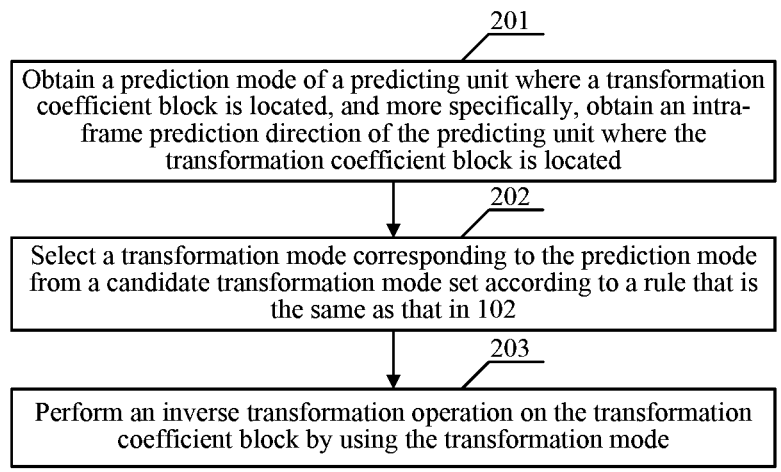
FIG. 3 is a schematic flowchart of a method according to an embodiment of the present invention.

Correspondingly, an embodiment of the present invention further provides a transformation mode selection procedure executed at a decoding end. As shown in FIG. 3, the transformation mode selection procedure includes:

201: Obtain a prediction mode of a predicted data block that corresponds to a transformation coefficient block of a to-be-decoded image, and more specifically, obtain an intra-frame prediction mode of the predicted data block that corresponds to the transformation coefficient block of the to-be-decoded image.

202: Select a transformation mode corresponding to the prediction mode from a candidate transformation mode set according to a rule that is the same as that in 102.

203: Perform an inverse transformation operation on the transformation coefficient block of the to-be-decoded image by using the transformation mode.

Figure 4:
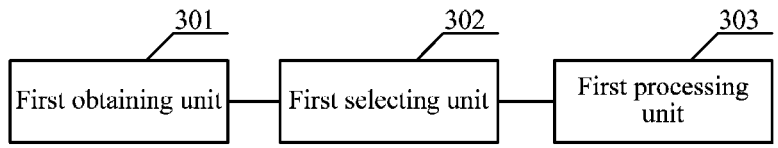
FIG. 4 is a schematic structural diagram of an apparatus according to an embodiment of the present invention.

A transformation mode encoding apparatus, as shown in FIG. 4, includes:
  a first obtaining unit 301, configured to obtain a prediction mode of a predicted data block that corresponds to a residual data block of the to-be-encoded video image;
  a first selecting unit 302, configured to select a transformation mode corresponding to the prediction mode from a candidate transformation mode set; and
  a first processing unit 303, configured to perform a transformation operation on the residual data block of the to-be-encoded video image by using the transformation mode.

Figure 5:
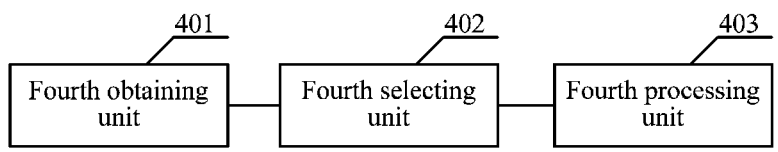
FIG. 5 is a schematic structural diagram of an apparatus according to an embodiment of the present invention.

A transformation mode decoding apparatus, as shown in FIG. 5, includes:
  a fourth obtaining unit 401, configured to obtain a prediction mode of a predicted data block that corresponds to a transformation coefficient block of a to-be-decoded image;
  a fourth selecting unit 402, configured to select a transformation mode corresponding to the prediction mode from a candidate transformation mode set; and
  a fourth processing unit 403, configured to perform an inverse transformation operation on the transformation coefficient block of the to-be-decoded image by using the transformation mode.

Figure 6:
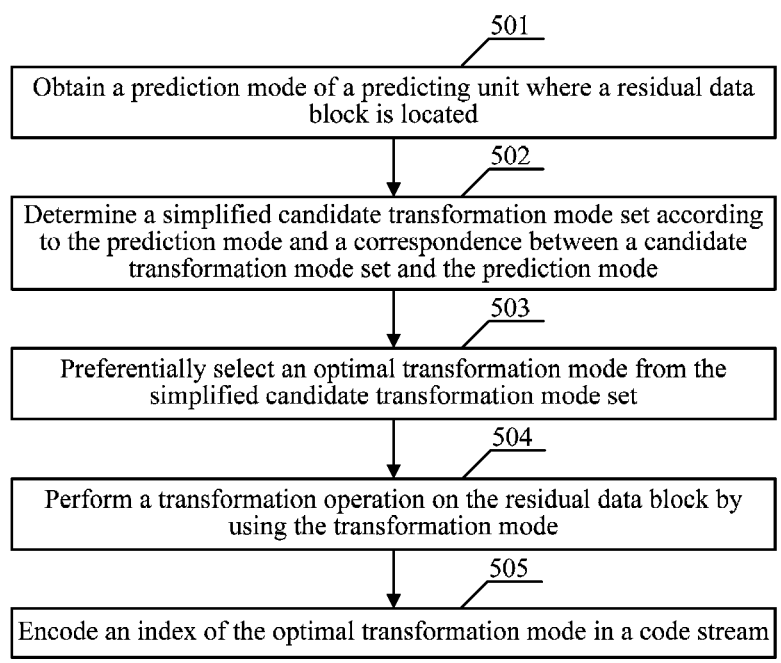
FIG. 6 is a schematic flowchart of a method according to an embodiment of the present invention.

Exemplary solution 2: The following describes a transformation mode selection procedure executed at an encoding end in detail. As shown in FIG. 6, the transformation mode selection procedure includes:

501: Obtain a prediction mode of a predicted data block that corresponds to a residual data block of the to-be-encoded video image, and more specifically, obtain an intra-frame prediction mode of the predicted data block that corresponds to the residual data block of the to-be-encoded video image.

502: Determine a simplified candidate transformation mode set according to the prediction mode and a correspondence between a candidate transformation mode set and the prediction mode, and more specifically, determine the simplified candidate transformation mode set according to a principle that "if a quantity of pixels that are among predicted pixels in the prediction mode and are located at an upper boundary and an upper right boundary of an encoding unit exceeds a set quantity, the candidate transformation mode is a latitudinal rectangular block transformation and a square block transformation; if a quantity of pixels that are among the predicted pixels in the prediction mode and are located at a left boundary and a lower left boundary of the encoding unit exceeds the set quantity, the candidate transformation mode is a longitudinal rectangular block transformation and the square block transformation; otherwise, the candidate transformation mode is the square block transformation". For example, in a horizontal prediction mode, select the longitudinal rectangular block transformation as a transformation type corresponding to the prediction mode and the square block transformation, and in a vertical prediction mode, select the latitudinal rectangular block transformation as a transformation type corresponding to the prediction mode and the square block transformation. A specific correspondence is not specifically limited in the principle. The quantity of the pixels among the predicted pixels and with a quantity exceeding the set quantity may be all, half, or two thirds, which is not specifically limited herein.

503: Preferentially select an optimal transformation mode from the simplified candidate transformation mode set, where the optimal transformation mode is used to minimize distortion of the to-be-encoded video image and a reconstructed video image that is obtained by a decoding end and minimize a quantity of encoding bits required for the to-be-encoded video image, and a method such as rate distortion optimization may be used, but a specific method is not limited herein.

504: Perform a transformation operation on the residual data block of the to-be-encoded video image by using the transformation mode.

505: Encode an index of the optimal transformation mode in a code stream, and more specifically, when the candidate transformation mode is the latitudinal rectangular block and the square block, use a flag bit 1 for indication; when the candidate transformation mode is the longitudinal rectangular block and the square block, use the flag bit 1 for indication; and when the candidate transformation mode is the square block, no flag bit needs to be used for indication. Step 504 and step 505 are not in a sequential relationship.

Figure 7:
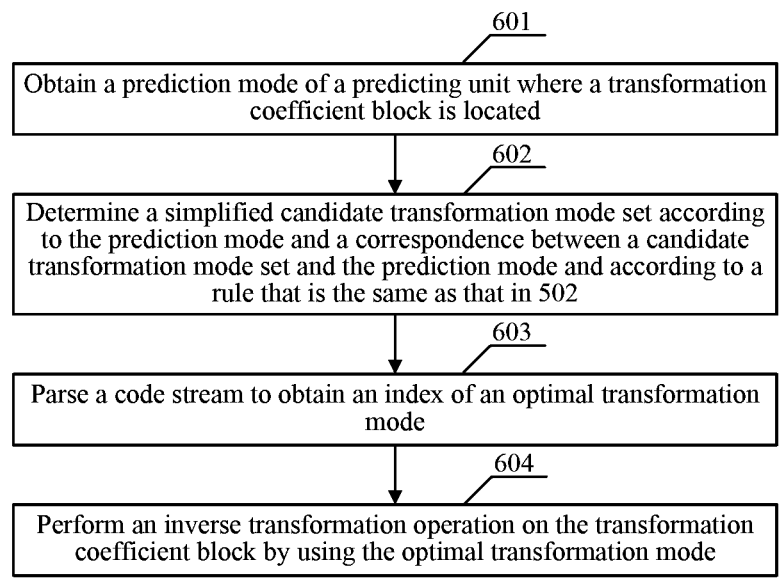
FIG. 7 is a schematic flowchart of a method according to an embodiment of the present invention.

Correspondingly, an embodiment of the present invention further provides a transformation mode selection procedure executed at a decoding end. As shown in FIG. 7, the transformation mode selection procedure includes:

601: Obtain a prediction mode of a predicted data block that corresponds to a transformation coefficient block of a to-be-decoded image, and more specifically, obtain an intra-frame prediction mode of the predicted data block that corresponds to the transformation coefficient block of the to-be-decoded image.

602: Determine a simplified candidate transformation mode set according to the prediction mode and a correspondence between a candidate transformation mode set and the prediction mode and according to a rule that is the same as that in 502.

603: Parse a code stream to obtain an index of an optimal transformation mode, and more specifically, corresponding to 503, when a candidate transformation mode is a latitudinal rectangular block and a square block, parse a flag bit 1 to obtain the index; when the candidate transformation mode is a longitudinal rectangular block and the square block, parse the flag bit 1 to obtain the index; and particularly, when the candidate transformation mode is the square block, no flag bit needs to be parsed.

604: Perform an inverse transformation operation on the transformation coefficient block of the to-be-decoded image by using the optimal transformation mode.

Figure 8:
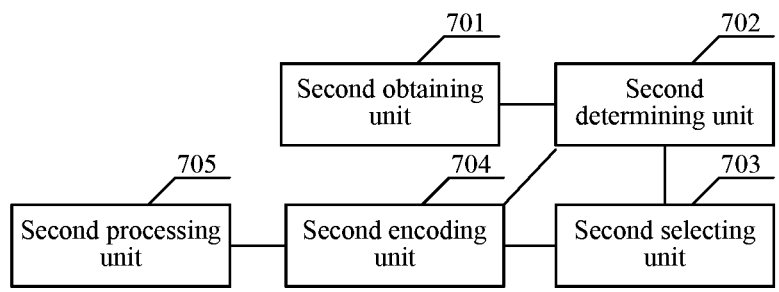
FIG. 8 is a schematic structural diagram of an apparatus according to an embodiment of the present invention.

A transformation mode encoding apparatus, as shown in FIG. 8, includes:

a second obtaining unit 701, configured to obtain a prediction mode of a predicted data block that corresponds to a residual data block of the to-be-encoded video image;

a second determining unit 702, configured to determine a simplified candidate transformation mode set according to the prediction mode and a correspondence between a candidate transformation mode set and the prediction mode;

a second selecting unit 703, configured to preferentially select an optimal transformation mode from the simplified candidate transformation mode set, where the optimal transformation mode is used to minimize distortion of the to-be-encoded video image and a reconstructed video image that is obtained by a decoding end and minimize a quantity of encoding bits required for the to-be-encoded video image;

a second encoding unit 704, configured to encode an index of the optimal transformation mode in a code stream; and a second processing unit 705, configured to perform a transformation operation on the residual data block of the to-be-encoded video image by using the optimal transformation mode.

Figure 9:
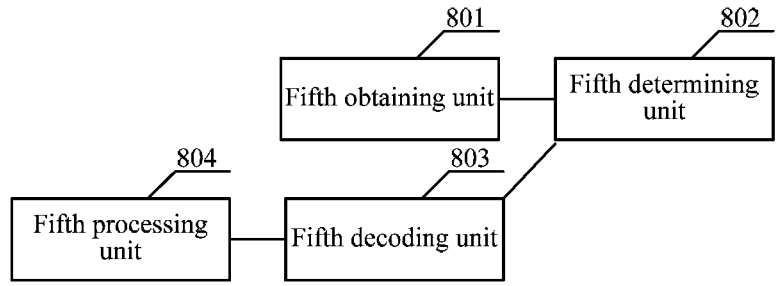
FIG. 9 is a schematic structural diagram of an apparatus according to an embodiment of the present invention.

A transformation mode decoding apparatus, as shown in FIG. 9, includes:

a fifth obtaining unit 801, configured to obtain a prediction mode of a predicted data block that corresponds to a transformation coefficient block of a to-be-decoded image;

a fifth determining unit 802, configured to determine a simplified candidate transformation mode set according to the prediction mode and a correspondence between a candidate transformation mode set and the prediction mode;

a fifth decoding unit 803, configured to parse a code stream to obtain an index of an optimal transformation mode; and a fifth processing unit 804, configured to perform an inverse transformation operation on the transformation coefficient block of the to-be-decoded image by using the transformation mode.

Figure 10:
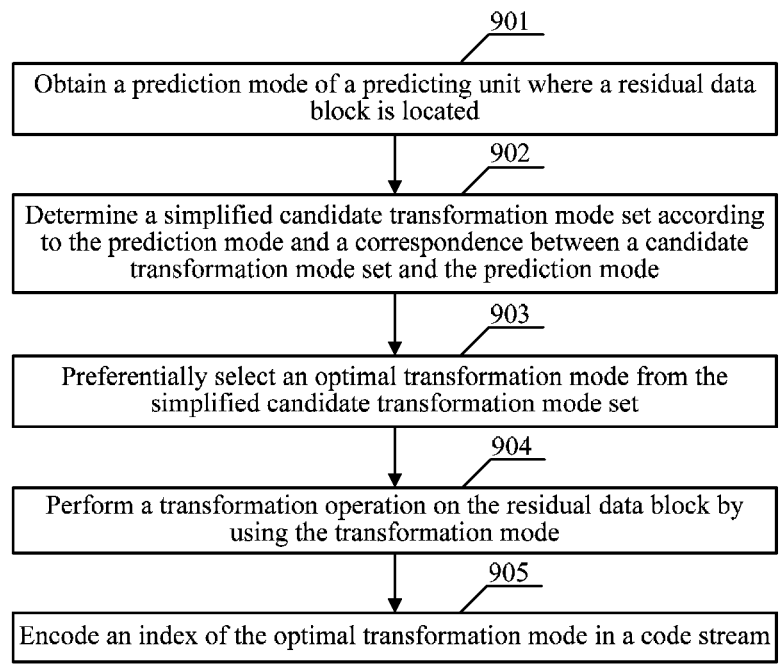
FIG. 10 is a schematic flowchart of a method according to an embodiment of the present invention.

Exemplary solution 3: The following describes a transformation mode selection procedure executed at an encoding end in detail. As shown in FIG. 10, the transformation mode selection procedure includes:

901: Obtain a prediction mode of a predicted data block that corresponds to a residual data block of the to-be-encoded video image, and more specifically, obtain an intra-frame prediction mode of the predicted data block that corresponds to the residual data block of the to-be-encoded video image.

902: Determine a simplified candidate transformation mode set according to the prediction mode and a correspondence between a candidate transformation mode set and the prediction mode, and more specifically, determine the simplified candidate transformation mode set according to a principle that "if a quantity of pixels that are among predicted pixels in the prediction mode and are located at an upper boundary and an upper right boundary of an encoding unit exceeds a set quantity, the candidate transformation mode is a latitudinal rectangular block transformation and a square block transformation; if a quantity of pixels that are among the predicted pixels in the prediction mode and are located at a left boundary and a lower left boundary of the encoding unit exceeds the set quantity, the candidate transformation mode is a longitudinal rectangular block transformation and the square block transformation; otherwise, the candidate transformation mode is the latitudinal rectangular block transformation, the longitudinal rectangular block transformation, and the square block transformation". For example, in a horizontal prediction mode, select the longitudinal rectangular block transformation as a transformation type corresponding to the prediction mode and the square block transformation, and in a vertical prediction mode, select the latitudinal rectangular block transformation as a transformation type corresponding to the prediction mode and the square block transformation. A specific correspondence is not specifically limited in the principle. The quantity of the pixels among the predicted pixels and with a quantity exceeding the set quantity may be all, half, or two thirds, which is not specifically limited herein.

903: Preferentially select an optimal transformation mode from the simplified candidate transformation mode set, where the optimal transformation mode is used to minimize distortion of the to-be-encoded video image and a reconstructed video image that is obtained by a decoding end and minimize a quantity of encoding bits required for the to-be-encoded video image, and a method such as rate distortion optimization may be used, but a specific method is not limited herein.

904: Perform a transformation operation on the residual data block of the to-be-encoded video image by using the transformation mode.

905: Encode an index of the optimal transformation mode in a code stream, and more specifically, when the candidate transformation mode is the latitudinal rectangular block and the square block, use a flag bit 1 for indication; when the candidate transformation mode is the longitudinal rectangular block and the square block, use the flag bit 1 for indication; and when the candidate transformation mode is the latitudinal rectangular block, the longitudinal rectangular block, and the square block, use the flag bit 1 to indicate whether the candidate transformation mode is the square block, and if the candidate transformation mode is not the square block, use the flag bit 1 again to indicate whether the candidate transformation mode is the latitudinal rectangular block or the longitudinal rectangular block. Step 904 and step 905 are not in a sequential relationship.

Figure 11:
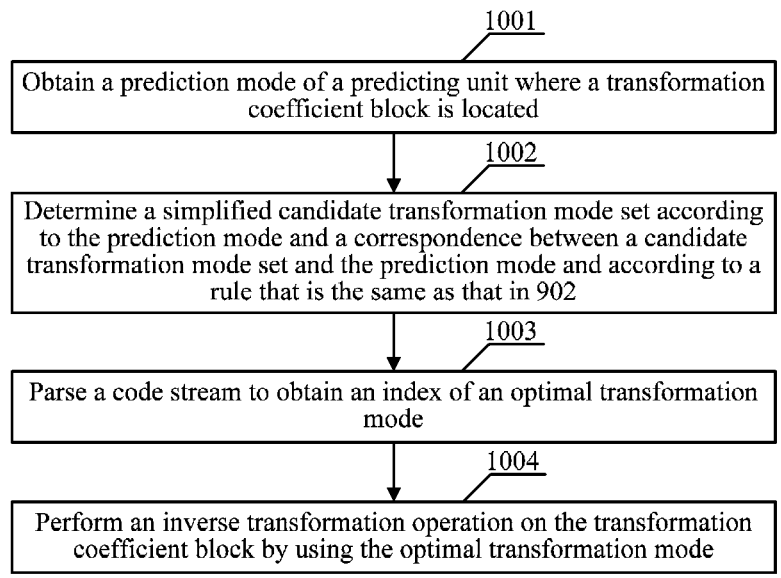
FIG. 11 is a schematic flowchart of a method according to an embodiment of the present invention.

Correspondingly, an embodiment of the present invention further provides a transformation mode selection procedure executed at a decoding end. As shown in FIG. 11, the transformation mode selection procedure includes:

1001: Obtain a prediction mode of a predicted data block that corresponds to a transformation coefficient block of a to-be-decoded image, and more specifically, obtain an intra-frame prediction mode of the predicted data block that corresponds to the transformation coefficient block of the to-be-decoded image.

1002: Determine a simplified candidate transformation mode set according to the prediction mode and a correspondence between a candidate transformation mode set and the prediction mode and according to a rule that is the same as that in 902.

1003: Parse a code stream to obtain an index of an optimal transformation mode, and more specifically, corresponding to 903, when a candidate transformation mode is a latitudinal rectangular block and a square block, parse a flag bit 1 to obtain the index; when the candidate transformation mode is a longitudinal rectangular block and the square block, parse the flag bit 1 to obtain the index; and when the candidate transformation mode is the latitudinal rectangular block, the longitudinal rectangular block, and the square block, parse the flag bit 1 to obtain whether the candidate transformation mode is the square block, and if the candidate transformation mode is not the square block, parse the flag bit 1 again to obtain whether the candidate transformation mode is the latitudinal rectangular block or the longitudinal rectangular block.

1004: Perform an inverse transformation operation on the transformation coefficient block of the to-be-decoded image by using the optimal transformation mode.

Figure 12:
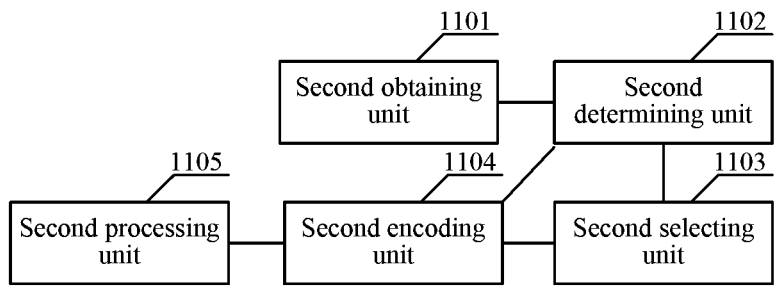
FIG. 12 is a schematic structural diagram of an apparatus according to an embodiment of the present invention.

A transformation mode encoding apparatus, as shown in FIG. 12, includes:
- a second obtaining unit 1101, configured to obtain a prediction mode of a predicted data block that corresponds to a residual data block of the to-be-encoded video image;
- a second determining unit 1102, configured to determine a simplified candidate transformation mode set according to the prediction mode and a correspondence between a candidate transformation mode set and the prediction mode;
- a second selecting unit 1103, configured to preferentially select an optimal transformation mode from the simplified candidate transformation mode set, where the optimal transformation mode is used to minimize distortion of the to-be-encoded video image and a reconstructed video image that is obtained by a decoding end and minimize a quantity of encoding bits required for the to-be-encoded video image;
- a second encoding unit 1104, configured to encode an index of the optimal transformation mode in a code stream; and
- a second processing unit 1105, configured to perform a transformation operation on the residual data block of the to-be-encoded video image by using the optimal transformation mode.

Figure 13:
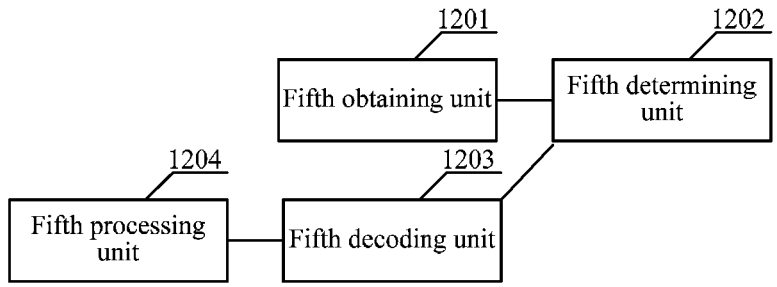
FIG. 13 is a schematic structural diagram of an apparatus according to an embodiment of the present invention.

A transformation mode decoding apparatus, as shown in FIG. 13, includes:
- a fifth obtaining unit 1201, configured to obtain a prediction mode of a predicted data block that corresponds to a transformation coefficient block of a to-be-decoded image;
- a fifth determining unit 1202, configured to determine a simplified candidate transformation mode set according to the prediction mode and a correspondence between a candidate transformation mode set and the prediction mode;
- a fifth decoding unit 1203, configured to parse a code stream to obtain an index of an optimal transformation mode; and
- a fifth processing unit 1204, configured to perform an inverse transformation operation on the transformation coefficient block of the to-be-decoded image by using the transformation mode.

Figure 14:
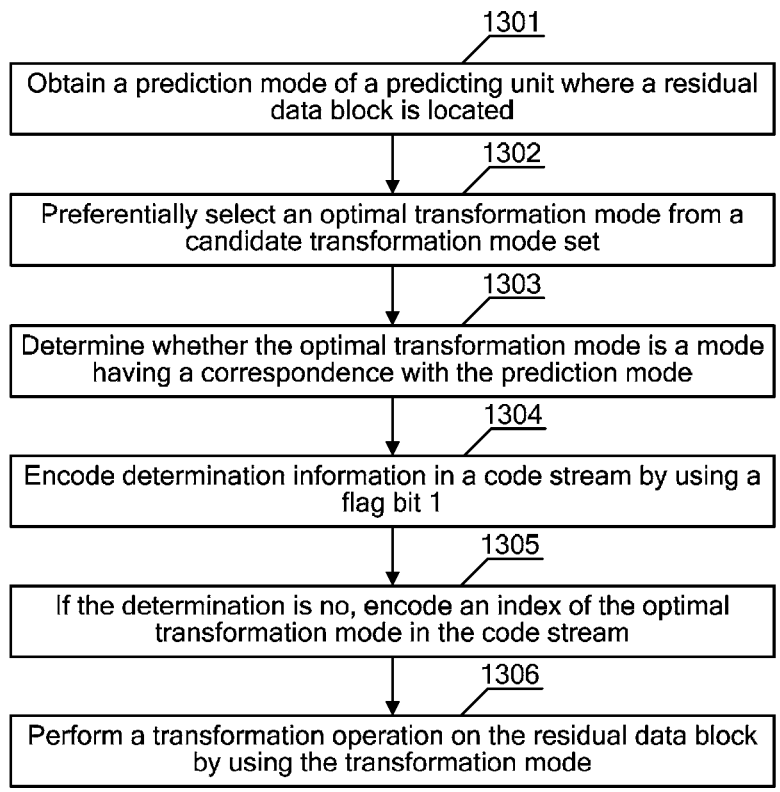
FIG. 14 is a schematic flowchart of a method according to an embodiment of the present invention.

Exemplary solution 4: The following describes a transformation mode selection procedure executed at an encoding end in detail. As shown in FIG. 14, the transformation mode selection procedure includes:

1301: Obtain a prediction mode of a predicted data block that corresponds to a residual data block of the to-be-encoded video image, and more specifically, obtain an intra-frame prediction mode of the predicted data block that corresponds to the residual data block of the to-be-encoded video image.

1302: Preferentially select an optimal transformation mode from a candidate transformation mode set, where the optimal transformation mode is used to minimize distortion of the to-be-encoded video image and a reconstructed video image that is obtained by a decoding end and minimize a quantity of encoding bits required for the to-be-encoded video image, and a method such as rate distortion optimization may be used, but a specific method is not limited herein.

1303: According to a principle that "if a quantity of pixels that are among predicted pixels in the prediction mode and are located at an upper boundary and an upper right boundary of an encoding unit exceeds a set quantity, the candidate transformation mode selects a latitudinal rectangular block transformation to serve as a corresponding transformation type of the prediction mode; when a quantity of pixels that are among the predicted pixels in the prediction mode and are located at a left boundary and a lower left boundary of the encoding unit exceeds the set quantity, a longitudinal rectangular block transformation is selected as the candidate transformation mode and as a transformation type corresponding to the prediction mode; otherwise, the candidate transformation mode corresponds to a square block transformation", determine whether the optimal transformation mode is a mode having a correspondence with the prediction mode. For example, in a horizontal prediction mode, select the longitudinal rectangular block transformation as a transformation type corresponding to the prediction mode, and in a vertical prediction mode, select the latitudinal rectangular block transformation as a transformation type corresponding to the prediction mode. A specific correspondence is not specifically limited in the principle. The quantity of the pixels among the predicted pixels and with a quantity exceeding the set quantity may be all, half, or two thirds, which is not specifically limited herein.

1304: Encode a determination result in a code stream by using a flag bit 1.

1305: If the determination is no, encode an index of the optimal transformation mode in the code stream, and more specifically, use the flag bit 1 for indication.

1306: Perform a transformation operation on the residual data block of the to-be-encoded video image by using the transformation mode. Steps 1304 and 1305 and step 1306 are not in a sequential relationship.

Figure 15:
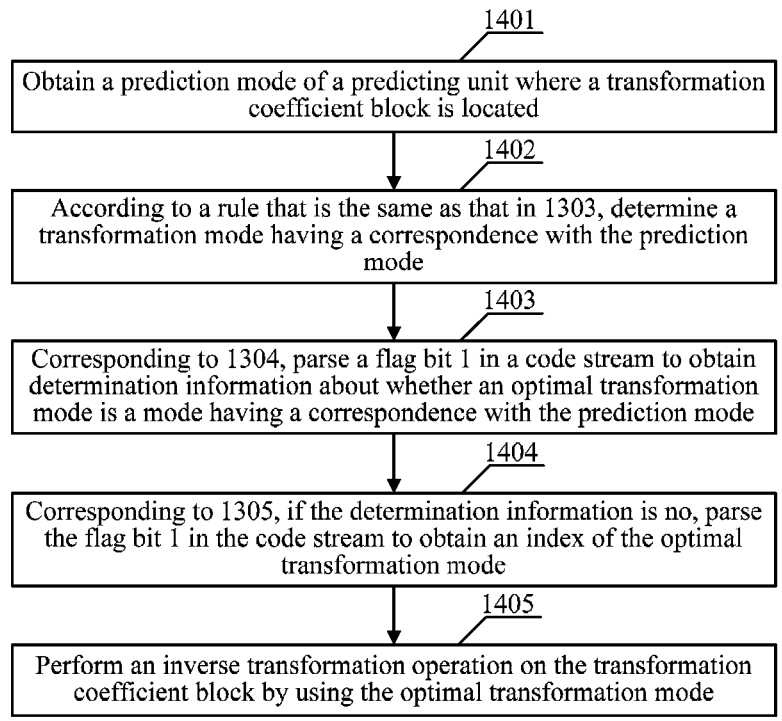
FIG. 15 is a schematic flowchart of a method according to an embodiment of the present invention.

Correspondingly, an embodiment of the present invention further provides a transformation mode selection procedure executed at a decoding end. As shown in FIG. 15, the transformation mode selection procedure includes:

1401: Obtain a prediction mode of a predicted data block that corresponds to a transformation coefficient block of a to-be-decoded image, and more specifically, obtain an intra-frame prediction mode of the predicted data block that corresponds to the transformation coefficient block of the to-be-decoded image.

1402: According to a rule that is the same as that in 1303, determine a transformation mode having a correspondence with the prediction mode.

1403: Corresponding to 1304, parse a flag bit 1 of a code stream to obtain a determination result about whether an optimal transformation mode is a mode having a correspondence with the prediction mode.

1404: Corresponding to 1305, if the determination result is no, parse the flag bit 1 of the code stream to obtain an index of the optimal transformation mode.

1405: Perform an inverse transformation operation on the transformation coefficient block of the to-be-decoded image by using the optimal transformation mode.

Figure 16:
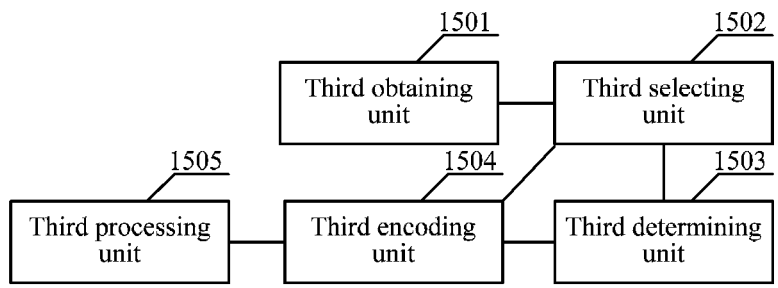
FIG. 16 is a schematic structural diagram of an apparatus according to an embodiment of the present invention.

A transformation mode encoding apparatus, as shown in FIG. 16, includes:

a third obtaining unit 1501, configured to obtain a prediction mode of a predicted data block that corresponds to a residual data block of the to-be-encoded video image;

a third selecting unit 1502, configured to preferentially select an optimal transformation mode from a candidate transformation mode set, where the optimal transformation mode is used to minimize distortion of the to-be-encoded video image and a reconstructed video image that is obtained by a decoding end and minimize a quantity of encoding bits required for the to-be-encoded video image;

a third determining unit 1503, configured to determine whether the optimal transformation mode is a mode having a correspondence with the prediction mode;

a third encoding unit 1504, configured to encode the determination result and an index of the optimal transformation mode in a code stream; and a third processing unit 1505, configured to perform a transformation operation on the residual data block of the to-be-encoded video image by using the optimal transformation mode.

Figure 17:
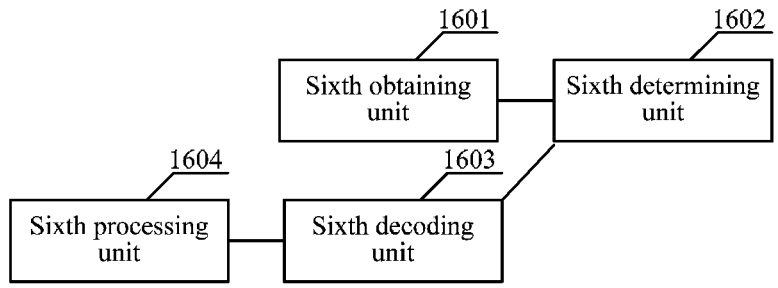
FIG. 17 is a schematic structural diagram of an apparatus according to an embodiment of the present invention.

A transformation mode decoding apparatus, as shown in FIG. 17, includes:

a sixth obtaining unit 1601, configured to obtain a prediction mode of a predicted data block that corresponds to a transformation coefficient block of a to-be-decoded image;

a sixth determining unit 1602, configured to determine, in a candidate transformation mode set, a transformation mode corresponding to the prediction mode;

a sixth decoding unit 1603, configured to parse a code stream to obtain a determination result about whether an optimal transformation mode is a mode having a correspondence with the prediction mode, and an index of the optimal transformation mode; and a sixth processing unit 1604, configured to perform an inverse transformation operation on the transformation coefficient block of the to-be-decoded image by using the transformation mode.

Figure 18:
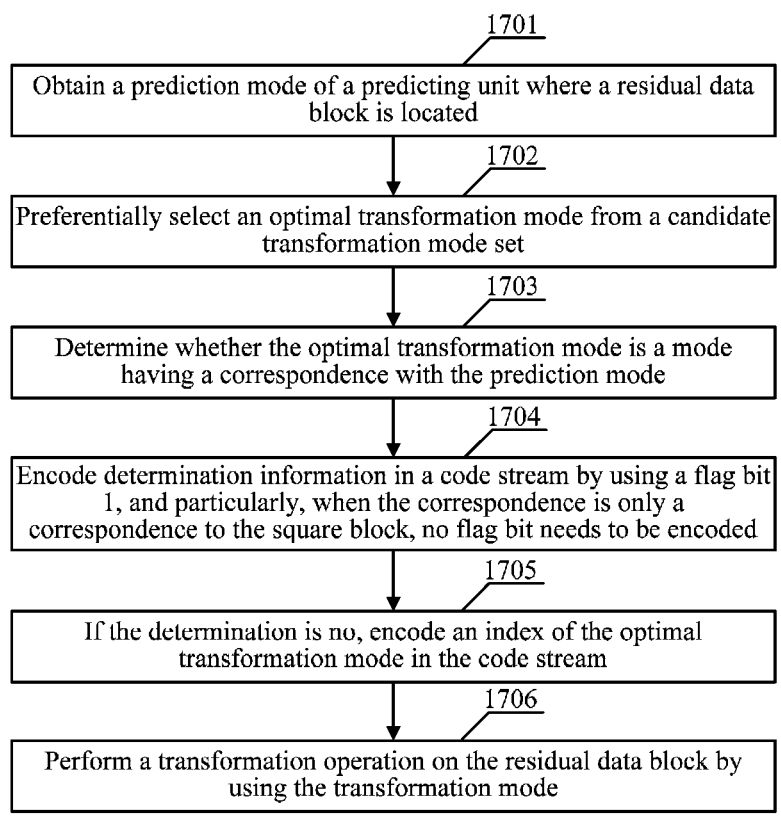
FIG. 18 is a schematic flowchart of a method according to an embodiment of the present invention.

Exemplary solution 5: The following describes a transformation mode selection procedure executed at an encoding end in detail. As shown in FIG. 18, the transformation mode selection procedure includes:

1701: Obtain a prediction mode of a predicted data block that corresponds to a residual data block of the to-be-encoded video image, and more specifically, obtain an intra-frame prediction mode of the predicted data block that corresponds to the residual data block of the to-be-encoded video image.

1702: Preferentially select an optimal transformation mode from a candidate transformation mode set, where the optimal transformation mode is used to minimize distortion of the to-be-encoded video image and a reconstructed video image that is obtained by a decoding end and minimize a quantity of encoding bits required for the to-be-encoded video image, and a method such as rate distortion optimization may be used, but a specific method is not limited herein.

1703: According to a principle that "if a quantity of pixels that are among predicted pixels in the prediction mode and are located at an upper boundary and an upper right boundary of an encoding unit exceeds a set quantity, a latitudinal rectangular block transformation is selected as the candidate transformation mode and as a transformation type corresponding to the prediction mode; when a quantity of pixels that are among the predicted pixels in the prediction mode and are located at a left boundary and a lower left boundary of the encoding unit exceeds the set quantity, a longitudinal rectangular block transformation is selected as the candidate transformation mode and as a transformation type corresponding to the prediction mode; otherwise, the optimal candidate transformation mode is a square block transformation", determine whether the optimal transformation mode is a mode having a correspondence with the prediction mode. For example, in a horizontal prediction mode, select the longitudinal rectangular block transformation as a transformation type corresponding to the prediction mode, and in a vertical prediction mode, select the latitudinal rectangular block transformation as a transformation type corresponding to the prediction mode. A specific correspondence is not specifically limited in the principle. The quantity of the pixels among the predicted pixels and with a quantity exceeding the set quantity may be all, half, or two thirds, which is not specifically limited herein.

1704: Encode a determination result in a code stream by using a flag bit 1, and particularly, when the correspondence is only a correspondence with the square block, no flag bit needs to be encoded.

1705: If the determination is no, encode an index of the optimal transformation mode in the code stream, and more specifically, use the flag bit 1 for indication.

1706: Perform a transformation operation on the residual data block of the to-be-encoded video image by using the transformation mode. Steps 1704 and 1705 and step 1706 are not in a sequential relationship.

Figure 19:
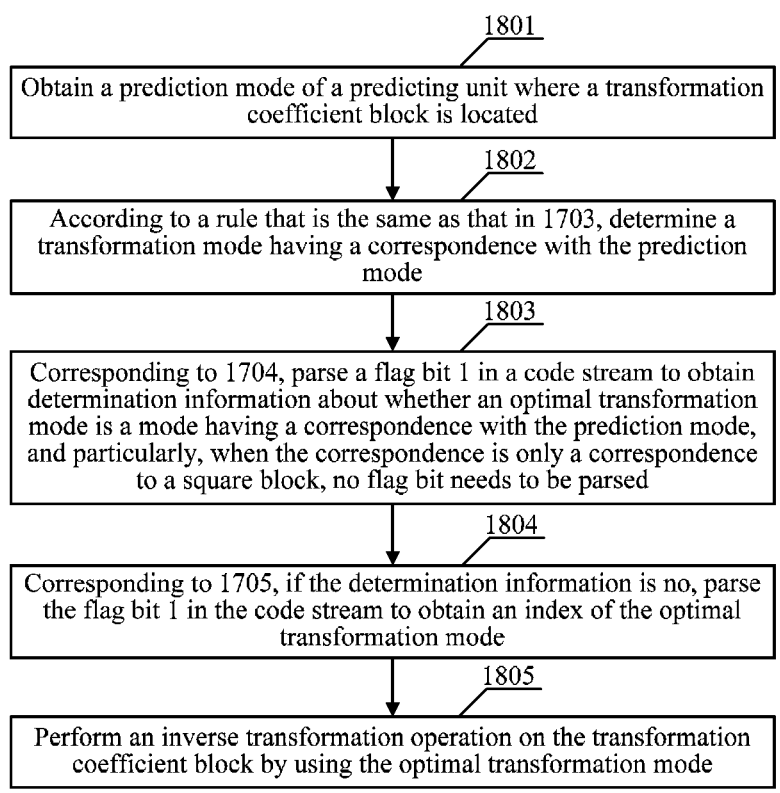
FIG. 19 is a schematic flowchart of a method according to an embodiment of the present invention.

Correspondingly, an embodiment of the present invention further provides a transformation mode selection procedure executed at a decoding end. As shown in FIG. 19, the transformation mode selection procedure includes:

1801: Obtain a prediction mode of a predicted data block that corresponds to a transformation coefficient block of a to-be-decoded image, and more specifically, obtain an intra-frame prediction mode of the predicted data block that corresponds to the transformation coefficient block of the to-be-decoded image.

1802: According to a rule that is the same as that in 1703, determine a transformation mode having a correspondence with the prediction mode.

1803: Corresponding to 1704, parse a flag bit 1 of a code stream to obtain a determination result about whether an optimal transformation mode is a mode having a correspondence with the prediction mode, and particularly, when the correspondence is only a correspondence with a square block, no flag bit needs to be parsed.

1804: Corresponding to 1705, if the determination result is no, parse the flag bit 1 of the code stream to obtain an index of the optimal transformation mode.

1805: Perform an inverse transformation operation on the transformation coefficient block of the to-be-decoded image by using the optimal transformation mode.

Figure 20:
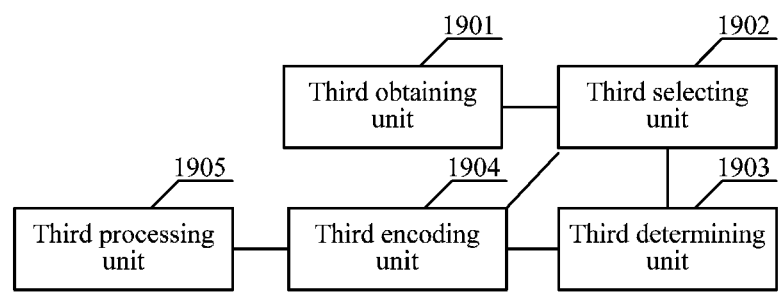
FIG. 20 is a schematic structural diagram of an apparatus according to an embodiment of the present invention.

A transformation mode encoding apparatus, as shown in FIG. 20, includes:
- a third obtaining unit 1901, configured to obtain a prediction mode of a predicted data block that corresponds to a residual data block of the to-be-encoded video image;
- a third selecting unit 1902, configured to preferentially select an optimal transformation mode from a candidate transformation mode set, where the optimal transformation mode is used to minimize distortion of the to-be-encoded video image and a reconstructed video image that is obtained by a decoding end and minimize a quantity of encoding bits required for the to-be-encoded video image;
- a third determining unit 1903, configured to determine whether the optimal transformation mode is a mode having a correspondence with the prediction mode;
- a third encoding unit 1904, configured to encode the determination result and an index of the optimal transformation mode in a code stream; and
- a third processing unit 1905, configured to perform a transformation operation on the residual data block of the to-be-encoded video image by using the optimal transformation mode.

Figure 21:
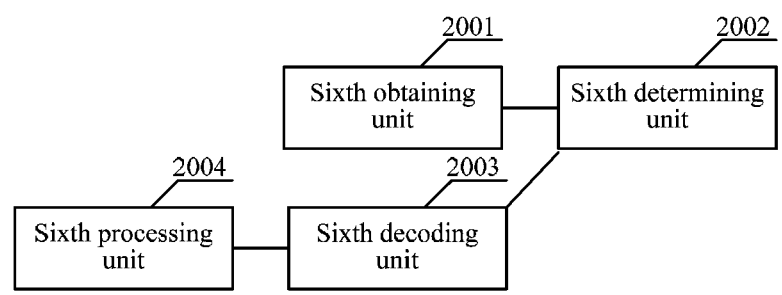
FIG. 21 is a schematic structural diagram of an apparatus according to an embodiment of the present invention.

A transformation mode decoding apparatus, as shown in FIG. 21, includes:
- a sixth obtaining unit 2001, configured to obtain a prediction mode of a predicted data block that corresponds to a transformation coefficient block of a to-be-decoded image;
- a sixth determining unit 2002, configured to determine, in a candidate transformation mode set, a transformation mode corresponding to the prediction mode; and a sixth decoding unit 2003, configured to parse a code stream to obtain a determination result about whether an optimal transformation mode is a mode having a correspondence with the prediction mode, and an index of the optimal transformation mode; and
- a sixth processing unit 2004, configured to perform an inverse transformation operation on the transformation coefficient block of the to-be-decoded image by using the transformation mode.

In the foregoing different embodiments, a correlation between prediction information and transformation mode information is used, and because of existence of the correlation, some redundant candidates in a candidate transformation mode set may be eliminated. In the embodiments, the candidate transformation mode set is simplified from different perspectives, encoding efficiency is improved at an encoding end, and encoding time and resource overhead are saved. Moreover, because a quantity of candidate modes is reduced, a smaller quantity of encoding bits may be used to indicate selection information of the candidate modes, thereby reducing header information and improving encoding performance.

The method provided in the embodiments of the present invention may be applied in the field of digital signal processing, and implemented by using a video encoder and decoder. The video encoder and decoder are widely applied in various communications devices or electronic devices, such as a media gateway, a mobile phone, a wireless apparatus, a personal digital assistant (PDA), a handheld or portable computer, a GPS receiver/navigator, a camera, a video player, a video camera, a video recorder, and a monitoring device. The devices include a processor, a memory, and an interface for transmitting data. The video encoder and decoder may be directly implemented by using a digital circuit or chip such as a DSP (digital signal processor); or may be implemented by software code driving a processor to execute a process in the software code.

A person of ordinary skill in the art can understand that, all or a part of the steps of the methods in the foregoing embodiments may be implemented by a program instructing relevant hardware. The foregoing program may be stored in a computer readable storage medium. The storage medium may be a read only memory, a magnetic disk, an optical disc, or the like.

The foregoing describes a method, an apparatus, and a system for scanning a transformation coefficient block of a to-be-decoded image that are provided in the embodiments of the present invention in detail. Specific examples are used in this specification to describe the principle and implementation manners of the present invention. The descriptions of the foregoing embodiments are merely intended to help understand the method and core idea of the present invention. In addition, with respective to the implementation manners and the application scope, modifications may be made by a person of ordinary skill in the art according to the idea of the present invention. Therefore, this specification shall not be construed as a limitation on the present invention.

What is claimed is:

1. A transformation mode encoding method, comprising:
obtaining a prediction mode of a predicted data block that corresponds to a residual data block of a video image to be encoded;
selecting a transformation mode corresponding to the prediction mode from a candidate transformation mode set; and
performing a transformation operation on the residual data block of the video image based on the transformation mode,
wherein the correspondence between the candidate transformation mode set and the prediction mode comprises:
if the prediction mode is an intra-frame prediction mode, when a quantity of pixels that are among predicted pixels in the prediction mode and are located at an upper boundary and an upper right boundary of an encoding unit exceeds a set quantity, selecting a latitudinal rectangular block transformation as a transformation type corresponding to the prediction mode; when a quantity of pixels that are among the predicted pixels in the prediction mode and are located at a left boundary and a lower left boundary of the encoding unit exceeds the set quantity, selecting a longitudinal rectangular block transformation as a transformation type corresponding to the prediction mode; otherwise, selecting a square block transformation as a transformation type corresponding to the prediction mode; or if the prediction mode is an intra-frame prediction mode, when a quantity of pixels that are among predicted pixels in the prediction mode and are located at an upper boundary and an upper right boundary of an encoding unit exceeds a set quantity, selecting a non-longitudinal rectangular block transformation as a transformation type corresponding to the prediction mode; when a quantity of pixels that are among the predicted pixels in the prediction mode and are located at a left boundary and a lower left boundary of the encoding unit exceeds the set quantity, selecting a non-latitudinal rectangular block transformation as a transformation type corresponding to the prediction mode; otherwise, selecting a preset transformation type in all transformation types as a transformation type corresponding to the prediction mode; or if prediction information represents a vertical texture, selecting a latitudinal rectangular block transformation as a transformation type corresponding to the prediction mode; if the prediction information represents a horizontal texture, selecting a longitudinal rectangular block transformation as a transformation type corresponding to the prediction mode; and if the prediction information represents no texture or an irregular texture, selecting a square block transformation as a transformation type corresponding to the prediction mode; or if prediction information represents a vertical texture, selecting a non-longitudinal rectangular block transformation as a transformation type corresponding to the prediction mode; if the prediction information represents a horizontal texture, selecting a non-latitudinal rectangular block transformation as a transformation type corresponding to the prediction mode; and if the prediction information represents no texture or an irregular texture, corresponding to all types of transformations; or if prediction information represents a latitudinal or non-longitudinal rectangular block transformation, selecting the latitudinal rectangular block transformation as a transformation type corresponding to the prediction mode; if the prediction information represents a longitudinal or non-latitudinal rectangular block transformation, selecting the longitudinal rectangular block transformation as a transformation type corresponding to the prediction mode; and if the prediction information represents a square block transformation, selecting the square block transformation as a transformation type corresponding to the prediction mode; or if prediction information represents a latitudinal or non-longitudinal rectangular block transformation, selecting the non-longitudinal rectangular block transformation as a transformation type corresponding to the prediction mode; if the prediction information represents a longitudinal or non-latitudinal rectangular block transformation, selecting the non-latitudinal rectangular block transformation as a transformation type corresponding to the prediction mode; and if the prediction information represents a square block transformation, corresponding to all types of transformations.

2. A transformation mode encoding method, comprising:

obtaining a prediction mode of a predicted data block that corresponds to a residual data block of a video image to be encoded;

determining a simplified candidate transformation mode set according to the prediction mode and a correspondence between a candidate transformation mode set and the prediction mode, wherein the simplified candidate transformation mode set is a set of candidate transformation modes having the correspondence with the prediction mode, and wherein simplifying the candidate transformation mode set comprises:

if a quantity of pixels that are among predicted pixels in the prediction mode and are located at an upper boundary and an upper right boundary of an encoding unit exceeds a set quantity, a candidate transformation mode is a latitudinal rectangular block transformation and a square block transformation; if a quantity of pixels that are among the predicted pixels in the prediction mode and are located at a left boundary and a lower left boundary of the encoding unit exceeds the set quantity, the candidate transformation mode is a longitudinal rectangular block transformation and the square block transformation; otherwise, the candidate transformation mode is the square block transformation; or if a quantity of pixels that are among predicted pixels in the prediction mode and are located at an upper boundary and an upper right boundary of an encoding unit exceeds a set quantity, the candidate transformation mode is a latitudinal rectangular block transformation and a square block transformation; if a quantity of pixels that are among the predicted pixels in the prediction mode and are located at a left boundary and a lower left boundary of the encoding unit exceeds the set quantity, the candidate transformation mode is a longitudinal rectangular block transformation and the square block transformation; otherwise, the candidate transformation mode is the latitudinal rectangular block transformation, the longitudinal rectangular block transformation, and the square block transformation;

selecting a transformation mode from the simplified candidate transformation mode set, wherein the transformation mode is used to minimize distortion of the video image and a reconstructed video image that is obtained by a decoding end and to minimize a quantity of encoding bits required for encoding the video image;

performing a transformation operation on the residual data block of the video image based on the optimal transformation mode; and encoding an index of the optimal transformation mode in a code stream.

3. A transformation mode encoding method, comprising:

obtaining a prediction mode of a predicted data block that corresponds to a residual data block of a video image to be encoded;

determining a simplified candidate transformation mode set according to the prediction mode and a correspondence between a candidate transformation mode set and the prediction mode;

selecting a transformation mode from the simplified candidate transformation mode set, wherein the transformation mode is used to minimize distortion of the video image and a reconstructed video image that is obtained by a decoding end and to minimize a quantity of encoding bits required for encoding the video image;

performing a transformation operation on the residual data block of the video image based on the optimal transformation mode; and encoding an index of the optimal transformation mode in a code stream, wherein encoding the index of the optimal transformation mode in the code stream comprises:

when the candidate transformation mode set comprises a latitudinal rectangular block and a square block, indicating, in the code stream, whether the optimal transformation mode is the latitudinal rectangular block or a longitudinal rectangular block based on a first flag bit;

when the candidate transformation mode set comprises a longitudinal rectangular block and a square block, indicating, in the code stream, whether the optimal transformation mode is a latitudinal rectangular block or the longitudinal rectangular block based on a first flag bit; and when the candidate transformation mode set comprises a latitudinal rectangular block, a longitudinal rectangular block, and a square block, indicating, in the code stream, whether the optimal transformation mode is the square block transformation based on a first flag bit; and if the first flag bit is no, indicating, in the code stream, whether the optimal transformation mode is the latitudinal rectangular block or the longitudinal rectangular block based on a second flag bit.

4. A transformation mode encoding method, comprising:

obtaining a prediction mode of a predicted data block that corresponds to a residual data block of a video image to be encoded;

selecting a transformation mode from a candidate transformation mode set, wherein the transformation mode is used to minimize distortion of the video image and a reconstructed video image that is obtained by a decoding end and to minimize a quantity of encoding bits required for the video image;

determining whether the optimal transformation mode is a mode having a correspondence with the prediction mode;

writing a determination result in a code stream;

if the optimal transformation mode is not a mode having a correspondence with the prediction mode, then encoding an index of the optimal transformation mode in the code stream; and performing a transformation operation on the residual data block of the video image based on the optimal transformation mode, wherein writing the determination result in the code stream comprises: indicating, in the code stream, whether the optimal transformation mode is a transformation mode having the correspondence with the prediction mode based on a third flag bit; and if the third flag bit is no, indicating, in the code stream, that the optimal transformation mode is one of two remaining transformation modes in the candidate transformation mode set based on a fourth flag bit.

5. A transformation mode decoding method, comprising:

obtaining a prediction mode of a predicted data block that corresponds to a transformation coefficient block of an image to be decoded;

selecting a transformation mode corresponding to the prediction mode from a candidate transformation mode set; and performing an inverse transformation operation on the transformation coefficient block of the image based on the transformation mode, wherein selecting the transformation mode comprises:

if the prediction mode is an intra-frame prediction mode, when a quantity of pixels that are among predicted pixels in the prediction mode and are located at an upper boundary and an upper right boundary of an encoding unit exceeds a set quantity, selecting a latitudinal rectangular block transformation as a transformation type corresponding to the prediction mode; when a quantity of pixels that are among the predicted pixels in the prediction mode and are located at a left boundary and a lower left boundary of the encoding unit exceeds the set quantity, selecting a longitudinal rectangular block transformation as a transformation type corresponding to the prediction mode; otherwise, selecting a square block transformation as a transformation type corresponding to the prediction mode; or if the prediction mode is an intra-frame prediction mode, when a quantity of pixels that are among predicted pixels in the prediction mode and are located at an upper boundary and an upper right boundary of an encoding unit exceeds a set quantity, selecting a non-longitudinal rectangular block transformation as a transformation type corresponding to the prediction mode; when a quantity of pixels that are among the predicted pixels in the prediction mode and are located at a left boundary and a lower left boundary of the encoding unit exceeds the set quantity, selecting a non-latitudinal rectangular block transformation as a transformation type corresponding to the prediction mode; otherwise, selecting a preset transformation type in all transformation types as a transformation type corresponding to the prediction mode; or if prediction information represents a vertical texture, selecting a latitudinal rectangular block transformation as a transformation type corresponding to the prediction mode; if the prediction information represents a horizontal texture, selecting a longitudinal rectangular block transformation as a transformation type corresponding to the prediction mode; and if the prediction information represents no texture or an irregular texture, selecting a square block transformation as a transformation type corresponding to the prediction mode; or if prediction information represents a vertical texture, selecting a non-longitudinal rectangular block transformation as a transformation type corresponding to the prediction mode; if the prediction information represents a horizontal texture, selecting a non-latitudinal rectangular block transformation as a transformation type corresponding to the prediction mode; and if the prediction information represents no texture or an irregular texture, corresponding to all types of transformations; or if prediction information represents a latitudinal or non-longitudinal rectangular block transformation, selecting the latitudinal rectangular block transformation as a transformation type corresponding to the prediction mode; if the prediction information represents a longitudinal or non-latitudinal rectangular block transformation, selecting the longitudinal rectangular block transformation as a transformation type corresponding to the prediction mode; and if the prediction information represents a square block transformation, selecting the square block transformation as a transformation type corresponding to the prediction mode; or if prediction information represents a latitudinal or non-longitudinal rectangular block transformation, selecting the non-longitudinal rectangular block transformation as a transformation type corresponding to the prediction mode; if the prediction information represents a longitudinal or non-latitudinal rectangular block transformation, selecting the non-latitudinal rectangular block transformation as a transformation type corresponding to the prediction mode; and if the prediction information represents a square block transformation, corresponding to all types of transformations.

6. A transformation mode decoding method, comprising:
obtaining a prediction mode of a predicted data block that corresponds to a transformation coefficient block of an image to be decoded;
determining a simplified candidate transformation mode set according to the prediction mode and a correspondence between a candidate transformation mode set and the prediction mode, wherein the simplified candidate transformation mode set is a set of candidate transformation modes having the correspondence with the prediction mode, and wherein simplifying the candidate transformation mode set comprises:
  if a quantity of pixels that are among predicted pixels in the prediction mode and are located at an upper boundary and an upper right boundary of an encoding unit exceeds a set quantity, the candidate transformation mode is a latitudinal rectangular block transformation and a square block transformation; if a quantity of pixels that are among the predicted pixels in the prediction mode and are located at a left boundary and a lower left boundary of the encoding unit exceeds the set quantity, the candidate transformation mode is a longitudinal rectangular block transformation and the square block transformation; otherwise, the candidate transformation mode is the square block transformation; or
  if a quantity of pixels that are among predicted pixels in the prediction mode and are located at an upper boundary and an upper right boundary of an encoding unit exceeds a set quantity, the candidate transformation mode is a latitudinal rectangular block transformation and a square block transformation; if a quantity of pixels that are among the predicted pixels in the prediction mode and are located at a left boundary and a lower left boundary of the encoding unit exceeds the set quantity, the candidate transformation mode is a longitudinal rectangular block transformation and a square block transformation; otherwise, the candidate transformation mode is a latitudinal rectangular block transformation, a longitudinal rectangular block transformation, and a square block transformation;

parsing a code stream to obtain an index of an optimal transformation mode; and
performing an inverse transformation operation on the transformation coefficient block of the image based on the optimal transformation mode corresponding to the index.

7. A transformation mode decoding method, comprising:
obtaining a prediction mode of a predicted data block that corresponds to a transformation coefficient block of an image to be decoded;
determining a simplified candidate transformation mode set according to the prediction mode and a correspondence between a candidate transformation mode set and the prediction mode;
parsing a code stream to obtain an index of an optimal transformation mode; and
performing an inverse transformation operation on the transformation coefficient block of the image based on the optimal transformation mode corresponding to the index,
wherein parsing the code stream to obtain the index of the optimal transformation mode comprises:
  when the candidate transformation mode set comprises a latitudinal rectangular block and a square block, parsing the code stream, and indicating whether the optimal transformation mode is the latitudinal rectangular block or a longitudinal rectangular block based on a fifth flag bit;
  when the candidate transformation mode set comprises a longitudinal rectangular block and a square block, parsing the code stream, and indicating whether the optimal transformation mode is a latitudinal rectangular block or the longitudinal rectangular block based on a fifth flag bit; and
  when the candidate transformation mode set comprises a latitudinal rectangular block, a longitudinal rectangular block, and a square block, parsing the code stream, indicating whether the optimal transformation mode is the square block transformation based on a fifth flag bit; and if the fifth flag bit is no, parsing the code stream, and indicating whether the optimal transformation mode is the latitudinal rectangular block or the longitudinal rectangular block based on a sixth flag bit.

8. A transformation mode decoding method, comprising:
obtaining a prediction mode of a predicted data block that corresponds to a transformation coefficient block of an image to be decoded;
parsing a code stream to obtain a determination result about whether an optimal transformation mode is a mode having a correspondence with the prediction mode;
if the determination result is no, parsing the code stream to obtain an index of the optimal transformation mode; and
performing an inverse transformation operation on the transformation coefficient block of the image based on the optimal transformation mode corresponding to the index,
wherein parsing the code stream to obtain the determination result comprises: parsing the code stream, indicating whether the optimal transformation mode is a transformation mode having the correspondence with the prediction mode based on a seventh flag bit; and if the seventh flag bit is no, parsing the code stream, and indicating that the optimal transformation mode is one of two remaining transformation modes in the candidate transformation mode set based on an eighth flag bit.

9. A transformation mode encoding apparatus, comprising:
a processor; and
a computer readable storage medium storing a program that, when executed by the processor, causes the transformation mode encoding apparatus to:
obtain a prediction mode of a predicted data block that corresponds to a residual data block of a video image to be encoded;
select a transformation mode corresponding to the prediction mode from a candidate transformation mode set; and
perform a transformation operation on the residual data block of the video image based on the transformation mode,
wherein the correspondence between the candidate transformation mode set and the prediction mode comprises:
if the prediction mode is an intra-frame prediction mode, when a quantity of pixels that are among predicted pixels in the prediction mode and are located at an upper boundary and an upper right boundary of an encoding unit exceeds a set quantity, selecting a latitudinal rectangular block transformation as a transformation type corresponding to the prediction mode; when a quantity of pixels that are among the predicted pixels in the prediction mode and are located at a left boundary and a lower left boundary of the encoding unit exceeds the set quantity, selecting a longitudinal rectangular block transformation as a transformation type corresponding to the prediction mode; otherwise, selecting a square block transformation as a transformation type corresponding to the prediction mode; or
if the prediction mode is an intra-frame prediction mode, when a quantity of pixels that are among predicted pixels in the prediction mode and are located at an upper boundary and an upper right boundary of an encoding unit exceeds a set quantity, selecting a non-longitudinal rectangular block transformation as a transformation type corresponding to the prediction mode; when a quantity of pixels that are among the predicted pixels in the prediction mode and are located at a left boundary and a lower left boundary of the encoding unit exceeds the set quantity, selecting a non-latitudinal rectangular block transformation as a transformation type corresponding to the prediction mode; otherwise, selecting a preset transformation type in all transformation types as a transformation type corresponding to the prediction mode; or
if prediction information represents a vertical texture, selecting a latitudinal rectangular block transformation as a transformation type corresponding to the prediction mode; if the prediction information represents a horizontal texture, selecting a longitudinal rectangular block transformation as a transformation type corresponding to the prediction mode; and if the prediction information represents no texture or an irregular texture, selecting a square block transformation as a transformation type corresponding to the prediction mode; or
if prediction information represents a vertical texture, selecting a non-longitudinal rectangular block transformation as a transformation type corresponding to the prediction mode; if the prediction information represents a horizontal texture, selecting a non-latitudinal rectangular block transformation as a transformation type corresponding to the prediction mode; and if the prediction information represents no texture or an irregular texture, corresponding to all types of transformations; or
if prediction information represents a latitudinal or non-longitudinal rectangular block transformation, selecting the latitudinal rectangular block transformation as a transformation type corresponding to the prediction mode; if the prediction information represents a longitudinal or non-latitudinal rectangular block transformation, selecting the longitudinal rectangular block transformation as a transformation type corresponding to the prediction mode; and if the prediction information represents a square block transformation, selecting the square block transformation as a transformation type corresponding to the prediction mode; or
if prediction information represents a latitudinal or non-longitudinal rectangular block transformation, selecting the non-longitudinal rectangular block transformation as a transformation type corresponding to the prediction mode; if the prediction information represents a longitudinal or non-latitudinal rectangular block transformation, selecting the non-latitudinal rectangular block transformation as a transformation type corresponding to the prediction mode; and if the prediction information represents a square block transformation, corresponding to all types of transformations.

10. A transformation mode encoding apparatus, comprising:
a processor; and
a computer readable storage medium storing a program that, when executed by the processor, causes the transformation mode encoding apparatus to:
obtain a prediction mode of a predicted data block that corresponds to a residual data block of a video image to be encoded;
determine a simplified candidate transformation mode set according to the prediction mode and a correspondence between a candidate transformation mode set and the prediction mode;
select a transformation mode from the simplified candidate transformation mode set, wherein the transformation mode is used to minimize distortion of the video image and a reconstructed video image that is obtained by a decoding end and minimize a quantity of encoding bits required for encoding the video image;
perform a transformation operation on the residual data block of the video image based on the transformation mode; and
encode an index of the transformation mode in a code stream, wherein encoding the index of the optimal transformation mode in the code stream comprises:
when the candidate transformation mode set comprises a latitudinal rectangular block and a square block, indicating, in the code stream, whether the optimal transformation mode is the latitudinal rectangular block or a longitudinal rectangular block based on a first flag bit;
when the candidate transformation mode set comprises a longitudinal rectangular block and a square block, indicating, in the code stream, whether the optimal transformation mode is a latitudinal rectangular block or the longitudinal rectangular block based on a first flag bit; and when the candidate transformation mode set comprises a latitudinal rectangular block, a longitudinal rectangular block, and a square block, indicating, in the code stream, whether the optimal transformation mode is the square block transformation based on a first flag bit; and if the first flag bit is no, indicating, in the code stream, whether the optimal transformation mode is the latitudinal rectangular block or the longitudinal rectangular block based on a second flag bit.

11. A transformation mode encoding apparatus, comprising:
a processor; and
a computer readable storage medium storing a program that, when executed by the processor, causes the transformation mode encoding apparatus to:
obtain a prediction mode of a predicted data block that corresponds to a residual data block of a video image to be encoded;
select a transformation mode from a candidate transformation mode set, wherein the transformation mode is used to minimize distortion of the video image and a reconstructed video image that is obtained by a decoding end and minimize a quantity of encoding bits required for encoding the video image;
determine whether the transformation mode is a mode having a correspondence with the prediction mode;
encode the determination result and an index of the transformation mode in a code stream, wherein encoding the determination result and the index of the transformation mode in the code stream comprises: indicating, in the code stream, whether the optimal transformation mode is a transformation mode having the correspondence with the prediction mode based on a third flag bit; and if the third flag bit is no, indicating, in the code stream, that the optimal transformation mode is one of two remaining transformation modes in the candidate transformation mode set based on a fourth flag bit; and
perform a transformation operation on the residual data block of the video image based on the transformation mode.

12. A transformation mode decoding apparatus, comprising:
a processor; and
a computer readable storage medium storing a program that, when executed by the processor, causes the transformation mode decoding apparatus to:
obtain a prediction mode of a predicted data block that corresponds to a transformation coefficient block of an image to be decoded;
select a transformation mode corresponding to the prediction mode from a candidate transformation mode set; and
perform an inverse transformation operation on the transformation coefficient block of the image based on the transformation mode,
wherein selecting the transformation mode comprises:
if the prediction mode is an intra-frame prediction mode, when a quantity of pixels that are among predicted pixels in the prediction mode and are located at an upper boundary and an upper right boundary of an encoding unit exceeds a set quantity, selecting a latitudinal rectangular block transformation as a transformation type corresponding to the prediction mode; when a quantity of pixels that are among the predicted pixels in the prediction mode and are located at a left boundary and a lower left boundary of the encoding unit exceeds the set quantity, selecting a longitudinal rectangular block transformation as a transformation type corresponding to the prediction mode; otherwise, selecting a square block transformation as a transformation type corresponding to the prediction mode; or if the prediction mode is an intra-frame prediction mode, when a quantity of pixels that are among predicted pixels in the prediction mode and are located at an upper boundary and an upper right boundary of an encoding unit exceeds a set quantity, selecting a non-longitudinal rectangular block transformation as a transformation type corresponding to the prediction mode; when a quantity of pixels that are among the predicted pixels in the prediction mode and are located at a left boundary and a lower left boundary of the encoding unit exceeds the set quantity, selecting a non-latitudinal rectangular block transformation as a transformation type corresponding to the prediction mode; otherwise, selecting a preset transformation type in all transformation types as a transformation type corresponding to the prediction mode; or if prediction information represents a vertical texture, selecting a latitudinal rectangular block transformation as a transformation type corresponding to the prediction mode; if the prediction information represents a horizontal texture, selecting a longitudinal rectangular block transformation as a transformation type corresponding to the prediction mode; and if the prediction information represents no texture or an irregular texture, selecting a square block transformation as a transformation type corresponding to the prediction mode; or if prediction information represents a vertical texture, selecting a non-longitudinal rectangular block transformation as a transformation type corresponding to the prediction mode; if the prediction information represents a horizontal texture, selecting a non-latitudinal rectangular block transformation as a transformation type corresponding to the prediction mode; and if the prediction information represents no texture or an irregular texture, corresponding to all types of transformations; or if prediction information represents a latitudinal or non-longitudinal rectangular block transformation, selecting the latitudinal rectangular block transformation as a transformation type corresponding to the prediction mode; if the prediction information represents a longitudinal or non-latitudinal rectangular block transformation, selecting the longitudinal rectangular block transformation as a transformation type corresponding to the prediction mode; and if the prediction information represents a square block transformation, selecting the square block transformation as a transformation type corresponding to the prediction mode; or if prediction information represents a latitudinal or non-longitudinal rectangular block transformation, selecting the non-longitudinal rectangular block transformation as a transformation type corresponding to the prediction mode; if the prediction information represents a longitudinal or non-latitudinal rectangular block transformation, selecting the non-latitudinal rectangular block transformation as a transformation type corresponding to the prediction mode; and if the prediction information represents a square block transformation, corresponding to all types of transformations.

13. A transformation mode decoding apparatus, comprising:
a processor; and
a computer readable storage medium storing a program that, when executed by the processor, causes the transformation mode decoding apparatus to:
obtain a prediction mode of a predicted data block that corresponds to a transformation coefficient block of an image to be decoded;
determine a simplified candidate transformation mode set according to the prediction mode and a correspondence between a candidate transformation mode set and the prediction mode;
parse a code stream to obtain an index of an optimal transformation mode; and
perform an inverse transformation operation on the transformation coefficient block of the image based on the transformation mode,
wherein parsing the code stream to obtain the index of the optimal transformation mode comprises:
when the candidate transformation mode set comprises a latitudinal rectangular block and a square block, parsing the code stream, and indicating whether the optimal transformation mode is the latitudinal rectangular block or a longitudinal rectangular block based on a fifth flag bit;
when the candidate transformation mode set comprises a longitudinal rectangular block and a square block, parsing the code stream, and indicating whether the optimal transformation mode is a latitudinal rectangular block or the longitudinal rectangular block based on a fifth flag bit; and
when the candidate transformation mode set comprises a latitudinal rectangular block, a longitudinal rectangular block, and a square block, parsing the code stream, indicating whether the optimal transformation mode is the square block transformation based on a fifth flag bit; and if the fifth flag bit is no, parsing the code stream, and indicating whether the optimal transformation mode is the latitudinal rectangular block or the longitudinal rectangular block based on a sixth flag bit.

14. A transformation mode decoding apparatus, comprising:
a processor; and
a computer readable storage medium storing a program that, when executed by the processor, causes the transformation mode decoding apparatus to:
obtain a prediction mode of a predicted data block that corresponds to a transformation coefficient block of an image to be decoded;
determine, in a candidate transformation mode set, a transformation mode corresponding to the prediction mode; and
parse a code stream to obtain a determination result about whether an optimal transformation mode is a mode having a correspondence with the prediction mode, and an index of the optimal transformation mode; and
perform an inverse transformation operation on the transformation coefficient block of the image based on the transformation mode,
wherein parsing the code stream to obtain the determination result comprises: parsing the code stream, indicating whether the optimal transformation mode is a transformation mode having the correspondence with the prediction mode based on a seventh flag bit; and if the seventh flag bit is no, parsing the code stream, and indicating that the optimal transformation mode is one of two remaining transformation modes in the candidate transformation mode set based on an eighth flag bit.

15. The method according to claim 1, wherein the prediction mode of the predicted data block that corresponds to the residual data block of the video image comprises:
an intra-frame prediction mode in intra-frame prediction; or
an inter-frame prediction unit division mode in inter-frame prediction; or
an intra-frame prediction unit division mode in intra-frame prediction; or
a transformation mode of a transformation coefficient block of a video image in a time domain or a spatial domain of the residual data block of the video image.

16. The method according to claim 1, wherein the candidate transformation mode set comprises:
a square block transformation, a latitudinal rectangular block transformation, and a longitudinal rectangular block transformation; or
a transformation reflecting no texture and an irregular texture, a transformation reflecting a latitudinal texture, and a transformation reflecting a longitudinal texture; or
a transformation reflecting no texture, a transformation reflecting an irregular texture, a transformation reflecting a latitudinal texture, and a transformation reflecting a longitudinal texture.

17. The method according to claim 3, wherein selecting the transformation mode comprises:
performing a rate distortion optimization method; or
performing a simplified encoding cost comparison method to calculate only encoding bits or calculate only distortion; or
performing an agreement between an encoding end and a decoding end.

18. The method according to claim 5, wherein the prediction mode of the predicted data block that corresponds to the transformation coefficient block of the image comprises:
an intra-frame prediction mode in intra-frame prediction; or
an inter-frame prediction unit division mode in inter-frame prediction; or
an intra-frame prediction unit division mode in intra-frame prediction; or
a transformation mode of the transformation coefficient block of the image in a time domain or a spatial domain of the transformation coefficient block of the image.

19. The method according to claim 5, wherein the candidate transformation mode set comprises:
a square block transformation, a latitudinal rectangular block transformation, and a longitudinal rectangular block transformation; or
a transformation reflecting no texture and an irregular texture, a transformation reflecting a latitudinal texture, and a transformation reflecting a longitudinal texture; or a transformation reflecting no texture, a transformation reflecting an irregular texture, a transformation reflecting a latitudinal texture, and a transformation reflecting a longitudinal texture.

* * * * *